US008098834B1

(12) United States Patent
O'Shea et al.

(10) Patent No.: US 8,098,834 B1

(45) Date of Patent: Jan. 17, 2012

(54) DISTRIBUTED AUDIO SYSTEM

(75) Inventors: Jeffrey S. O'Shea, San Diego, CA (US); Dennis M. O'Shea, San Juan Capistrano, CA (US)

(73) Assignee: Sound Merchandising, Inc., San Diego, CA (US)

( * ) Notice: Subject to any disclaimer, the term of this patent is extended or adjusted under 35 U.S.C. 154(b) by 971 days.

(21) Appl. No.: 12/053,097

(22) Filed: Mar. 21, 2008

Related U.S. Application Data

(60) Provisional application No. 60/896,900, filed on Mar. 24, 2007.

(51) Int. Cl.
*H02J 7/00* (2006.01)

(52) U.S. Cl. ............................ 381/59; 381/79; 381/394

(58) Field of Classification Search .................... 381/59, 381/79, 394
See application file for complete search history.

(56) References Cited

U.S. PATENT DOCUMENTS

| | | | | |
|---|---|---|---|---|
| 4,177,500 | A | 12/1979 | Nicholl et al. | 362/20 |
| 4,536,694 | A | 8/1985 | McCarty et al. | 320/2 |
| 5,075,615 | A | 12/1991 | Dantis | 320/2 |
| 5,239,610 | A | 8/1993 | Shao | 392/363 |
| 5,587,645 | A | 12/1996 | Sciammarella et al. | 320/2 |
| 5,648,712 | A | 7/1997 | Hahn | 320/2 |
| 6,371,815 | B1 | 4/2002 | Wetzel et al. | 439/651 |
| 6,377,172 | B1 | 4/2002 | Neer | 340/539 |
| 6,845,840 | B2 | 1/2005 | Cowan et al. | 181/150 |
| 6,930,702 | B1 | 8/2005 | Ferren et al. | 348/14.11 |
| 7,006,002 | B2 | 2/2006 | Schomali | 340/693.1 |
| 7,086,907 | B2 | 8/2006 | Bhavnani | 439/638 |
| 7,146,180 | B1 | 12/2006 | Liu | 455/465 |
| 7,156,673 | B2 | 1/2007 | Son | 439/131 |
| 2001/0046305 | A1 | 11/2001 | Muranami et al. | 381/77 |
| 2007/0077965 | A1 * | 4/2007 | Fox | 455/557 |
| 2007/0092088 | A1 * | 4/2007 | Chang | 381/79 |
| 2011/0068742 | A1 * | 3/2011 | McCurry et al. | 320/114 |
| 2011/0206088 | A1 * | 8/2011 | Binder et al. | 375/136 |
| 2011/0210833 | A1 * | 9/2011 | McNeely et al. | 340/286.07 |

* cited by examiner

*Primary Examiner* — A O Williams

(74) *Attorney, Agent, or Firm* — Christopher P. Maiorana, PC

(57) ABSTRACT

An apparatus comprising a housing, a speaker, and an amplifier. The speaker may be mounted within the housing. A concave portion may be implemented in the housing and may be configured to hold a transformer. An amplifier may be implemented within the housing and may be configured to receive power through a connection to the transformer.

16 Claims, 8 Drawing Sheets

(A)

(B)

DISTRIBUTED AUDIO SYSTEM

This application claims the benefit of U.S. Provisional Application No. 60/896,900, filed Mar. 24, 2007 and is hereby incorporated by reference in its entirety.

FIELD OF THE INVENTION

The present invention relates to a distributed audio system generally and, more particularly, to a distributed audio system speaker that plugs into a wall outlet.

BACKGROUND OF THE INVENTION

Electronic devices normally operate using direct current (DC). Most homes and buildings supply alternating current (AC) through wall outlets. Transformers are used to convert the AC power from the wall outlet into DC power used by most electronic devices. Such transformers are often integrated into an electronic device. An electronic device that plugs directly into a wall outlet (i.e., with an integrated power supply) must normally pass a certification process in order to be sold in many markets, such as the United States. Certifying an entire product is both expensive and time consuming.

Many companies will implement an external transformer, sometimes called a "wall wart", to avoid certifying a particular product. Such external power supplies have a cord that has the transformer either positioned at the plug or positioned somewhere in the middle of the cord. Such external transformers are not part of the device, but rather plug into the device. In such an arrangement, the external transformer would need to be certified, but the device would not need to be certified. However, with devices such a speaker systems, external transformers add to the clutter of cords found in many consumer installations. Cord clutter is aesthetically undesirable and often leads to compromises in an audio installation.

It would be desirable to implement a speaker system that has the advantages of being plugged directly into a wall outlet while maintaining the advantages associated with having a third party certified external transformer/power supply.

SUMMARY OF THE INVENTION

The present invention concerns an apparatus comprising a housing, a speaker, and an amplifier. The speaker may be mounted within the housing. A concave portion may be implemented in the housing and may be configured to hold a transformer. The amplifier may be implemented within the housing and may be configured to receive power through a connection to the transformer.

The objects, features and advantages of the present invention include providing a distributed audio system that may (i) plug directly into a wall outlet, (ii) be implemented without going through a certification process, (iii) provide a common signal to each speaker and/or (iv) provide an easy to install system.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention concerns an audio speaker that may be useful as a wireless distributed audio system. A cavity in the speaker may be used to let a transformer (or power supply) either sit inside the speaker, or extend out from the speaker with a short wire. The wire may be tucked into the speaker along with the transformer. The speaker may effectively be plugged into and hang from a wall receptacle, even though the speaker is in effect only clipped on to the transformer, with the transformer being plugged into the wall receptacle. Since the present invention does not use an integrated power supply, but rather implements a separate transformer, no certification of the speaker is needed.

Figure 1:
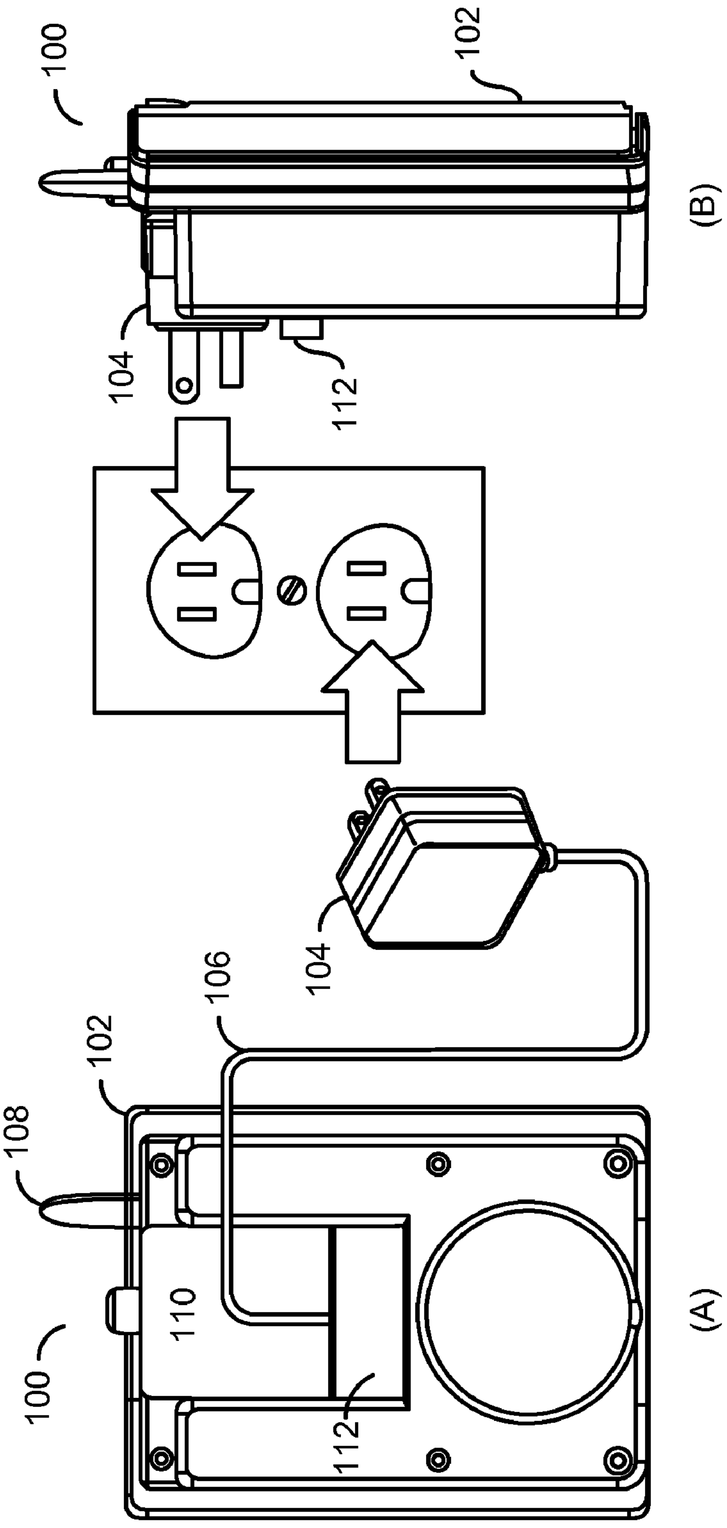
FIGS. 1A and 1B are diagrams illustrating a speaker having a transformer in both a secured position and an unsecured position.

Referring to FIGS. 1A and 1B, diagrams of a speaker 100 are shown in accordance with a preferred embodiment of the present invention. The speaker 100 may include an integrated power adapter. In FIG. 1A, the speaker 100 is shown generally comprising a housing 102, a transformer (or power adapter) 104, a wire 106, and an antenna 108. The housing 102 may have a cavity 110 and a clip 112. The transformer 104 is shown in an extended position, generally separated from the housing. However, the transformer 104 remains connected to the housing 102 by the wire 106. In such an arrangement, the transformer 104 may be plugged into a wall outlet, while the housing 102 may be positioned on a shelf, table, floor, etc. The length of the wire 106 may be selected to be long enough to allow mobility of the housing in relation to the wall outlet, but short enough to be tucked into the cavity 110.

In FIG. 1B, the speaker 100 is shown having the transformer 104 in a secured position. The transformer 104 is normally positioned within the cavity 110 and secured by the clip 112. In one example, the clip 112 may be implemented as a plate that swivels away from the housing 102. However, other types of clips 112 may be implemented to meet the design criteria of a particular implementation. The clip 112 secures the transformer 104 when the transformer 104 is within the cavity 110 of the housing 102. The cavity 110 may be implemented as a concave portion within the housing configured to hold the transformer 104.

In addition to the elements described, the speaker 100 may also include an amplifier and a speaker driver. The amplifier and the speaker driver may be positioned inside the housing 102. The speaker driver may be positioned to allow sounds produced by the amplifier to be projected into a listening environment. The amplifier may receive power from the transformer 104 through the wire 106. The amplifier may receive a source signal from the antenna 108. The antenna 108 may receive the source signal wirelessly from a remotely located base station (to be described in more detail in connection with FIG. 4). By wirelessly receiving the source signal using the antenna 108, positioning of the speaker in a listening room, or within different rooms of a building or house, may be very flexible.

Figure 2:
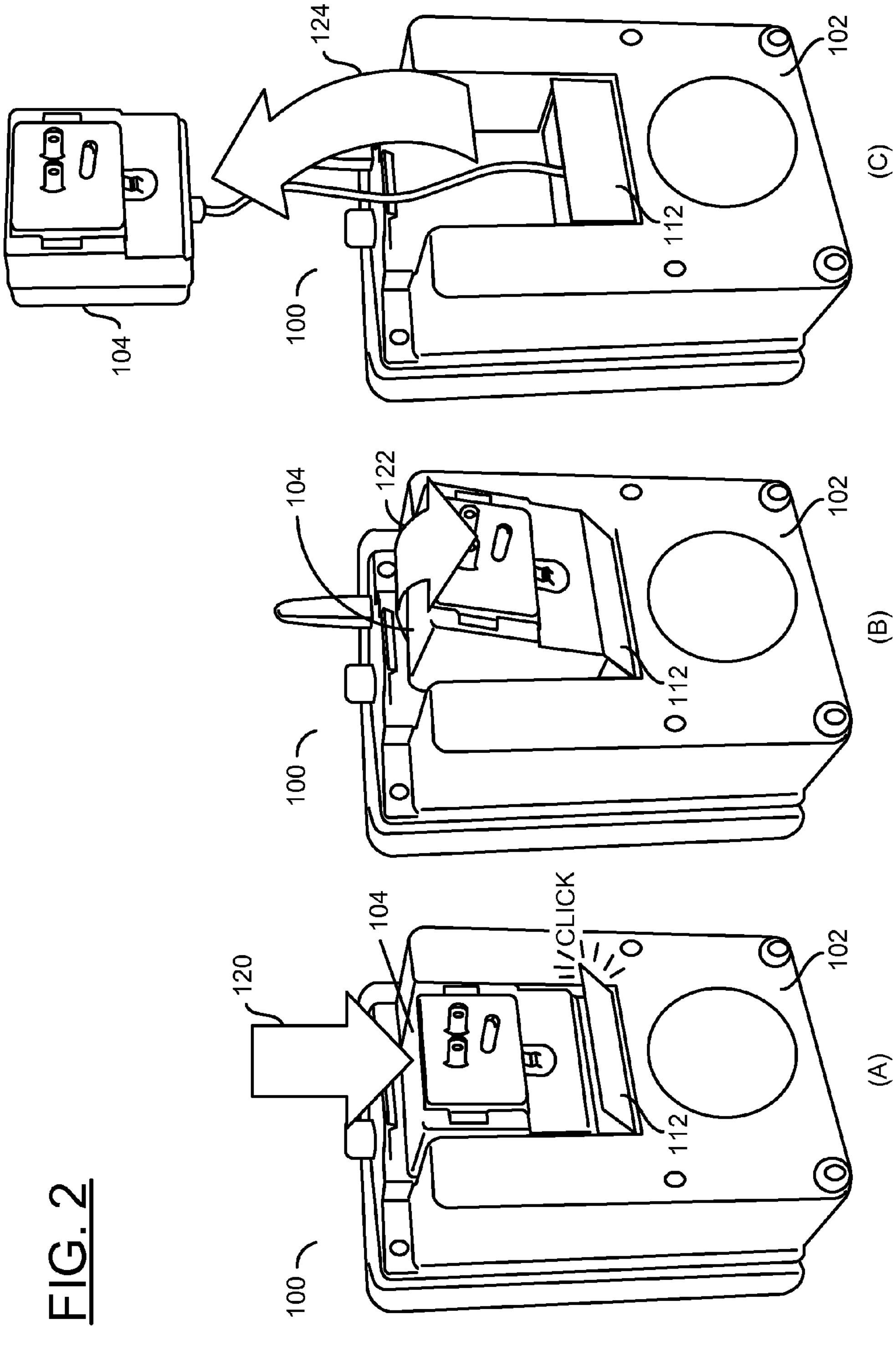
FIGS. 2A-C are diagrams illustrating a transformer being removed from a speaker system.

Referring to FIGS. 2A-C, diagrams illustrating the installation and/or removal of the transformer 104 within the speaker 100 are shown. In FIG. 2A the transformer 104 is shown in an initially secured position. An arrow 120 is shown representing a force that is placed on the transformer 104. The force 120 normally causes the transformer 104 to push a top portion of the clip 112 away from the housing 102. A bottom portion of the clip 112 is normally configured to remain connected to the housing 102, generally forming a hinge.

In FIG. 2B the transformer 104 is shown in a partially disengaged position. An arrow 122 is shown representing a force that is placed on the transformer 104. The force 122 normally causes a top portion of the transformer 104 to be pushed away from the housing 102.

FIG. 2C shows the transformer 104 removed from the housing 102. An arrow 124 represents a force that pushes the transformer 104 away from the housing. The clip 112 may be swivelled back into the closed position. The forces 120, 122 and 124 are examples of forces used to remove the transformer 104 from the housing 102. To install the transformer 104, the forces 120, 122 and 124 may be applied in the reverse order (e.g., first the force 124, then the force 122, then the force 120) and opposite direction. The forces 120, 122 and 124 are normally applied by an operator of the speaker 100. While the forces 120, 122 and 124 have been described as discrete forces, a single force that accomplishes the removal of the transformer 104 may be used.

The speaker 100 may be designed to accommodate a particular sized transformer 104. While different transformers are available for different applications, often with different sizes, shapes and/or voltage specifications, the speaker 100 may be designed for a particular transformer 104. Since the voltage specifications for the speaker will remain relatively unchanged through subsequent production runs, the size of the transformer 104 should normally be kept constant during subsequent manufacturing of the speaker. In certain instances, the exact transformer 104 the speaker 100 was designed to accommodate initially may not be available. In such an instance, a smaller (or larger) sized transformer 104 may be used. In one example, the cavity may be resized to fit the new transformer 104. In another example, the cavity 110 may be supplemented with an intermediate shim, insert or other material to hold the transformer 104 without the need to redesign the cavity 110.

While the speaker 100 normally holds the transformer 104 securely, additional steps may be taken to provide an even more secure attachment between the transformer 104 and the speaker 100. In one example, a hook and loop fastener, such as Velcro (registered trademark of Velcro Industries B.V.), may be used to hold the transformer 104 in place, in addition to the clip 112. In another example, a screw may be used to secure the clip 112 after the transformer 104 is secured in the housing 102. Care should be taken so that such a screw does not damage the transformer.

Figure 3A:
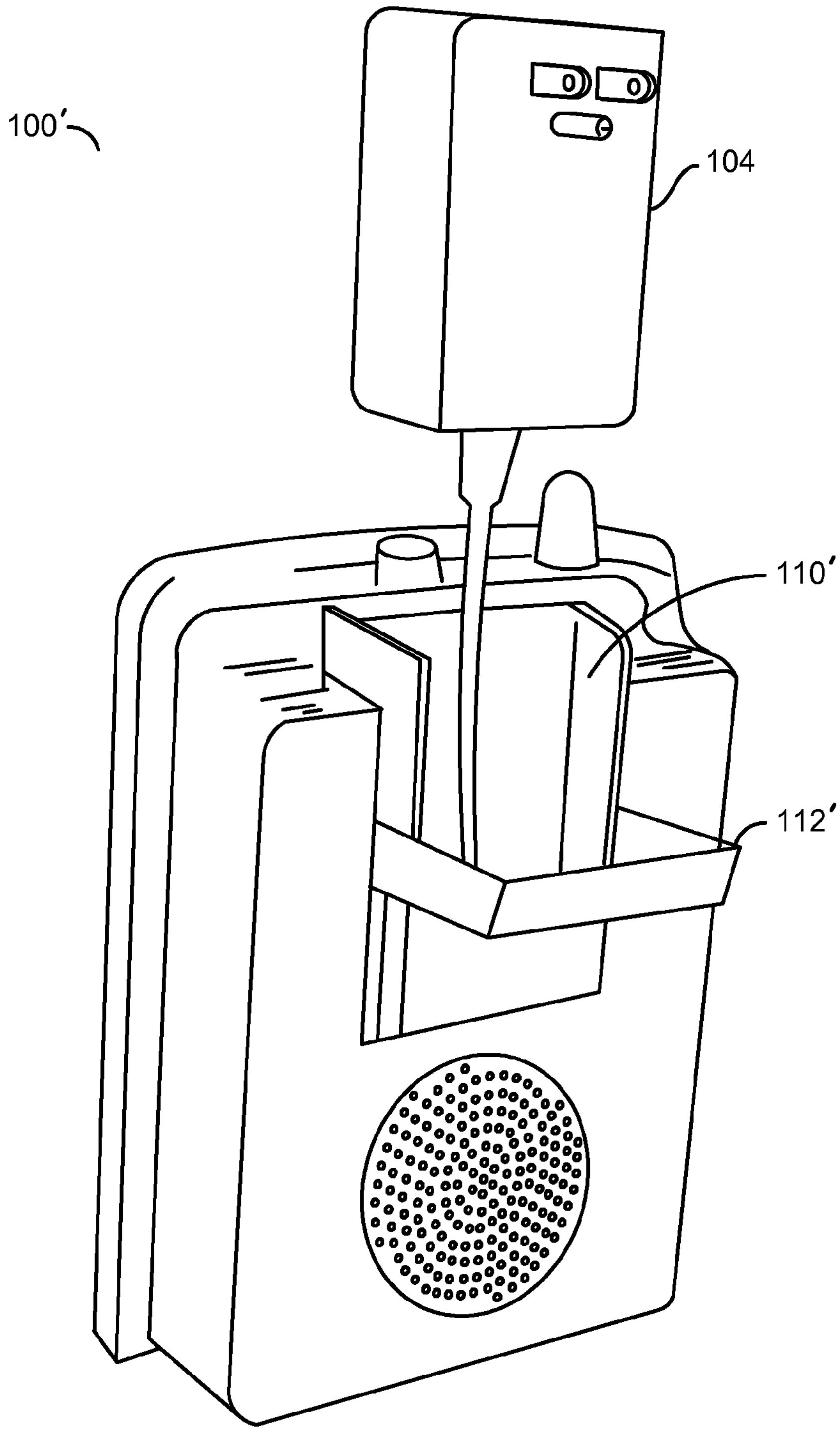
FIGS. 3A and 3B are diagrams illustrating an alternate arrangement of a speaker having a transformer in both an unsecured position and a partially secured position.
Figure 3B:
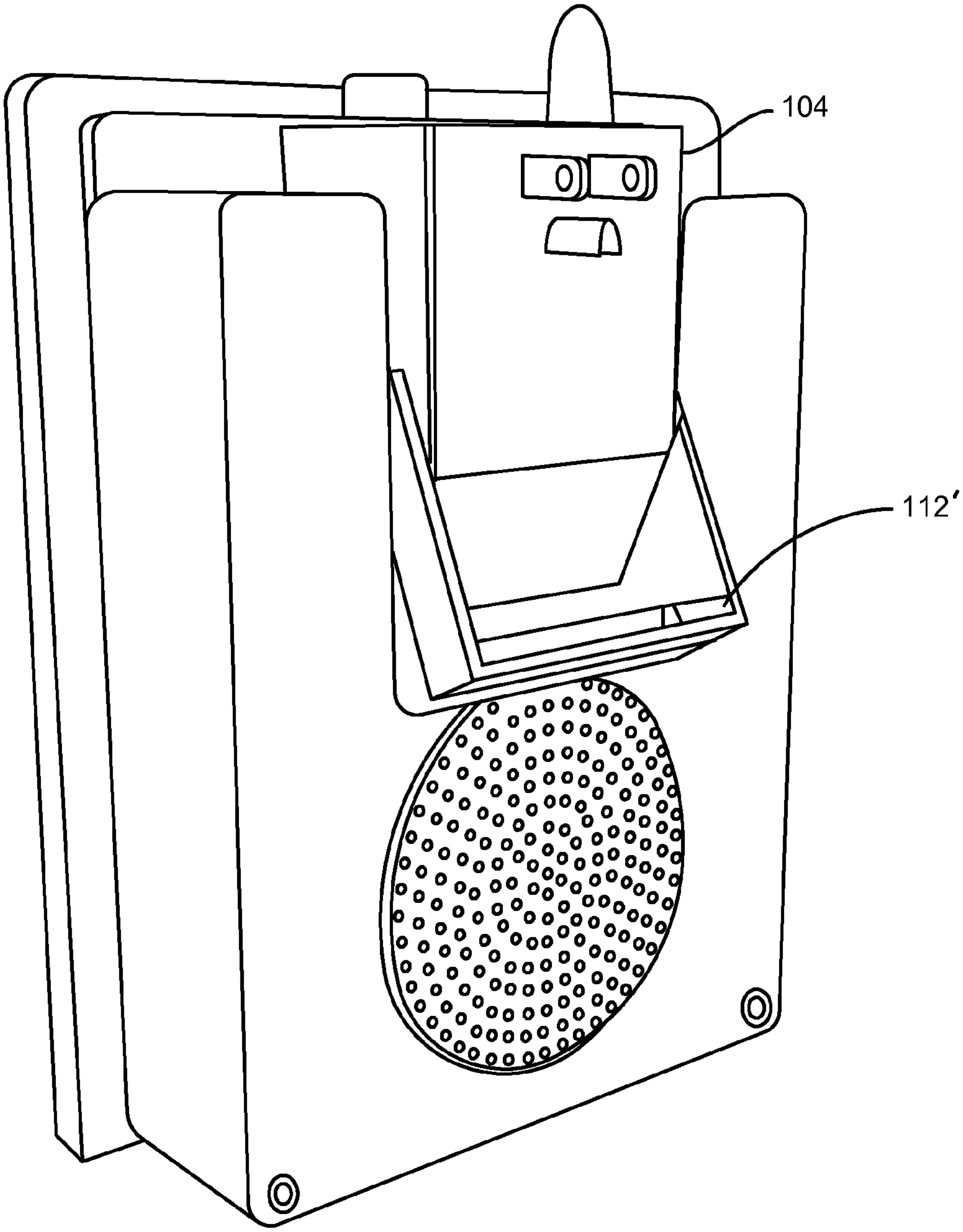

Referring to FIGS. 3A and 3B, a speaker 100' is shown illustrating an alternate embodiment of the present invention. The speaker 100' has an alternate clip 112'. The clip 112' is shown in an open position with the transformer 104 separated from the speaker 100'. In FIG. 3B, the clip 112' is shown in a down position. The down position allows the transformer 104 to be moved in and out of the cavity 110' of the speaker 100'. Once the transformer 104 is positioned within the cavity 110', the clip 112' is normally rotated to the top of the transformer 104. The clip 112' normally provides a downward force to hold the transformer 104 in place. While two types of clips (e.g., the clip 112 and the clip 112') have been described, other types of clips may be used to meet the design criteria of a particular implementation.

Figure 4:
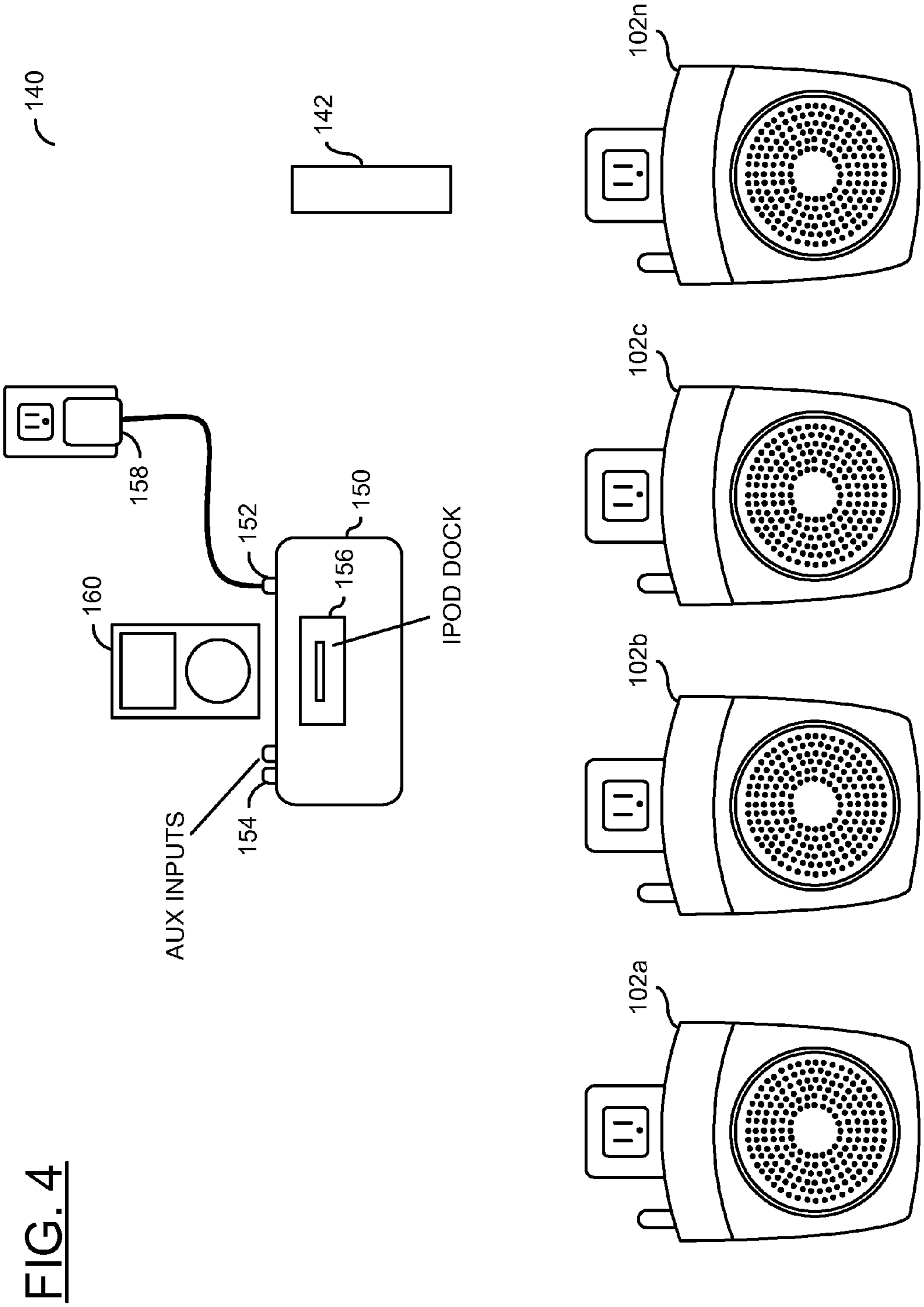
FIG. 4 is a diagram of an audio system illustrating a number of speakers plugged directly into a wall.

Referring to FIG. 4, a diagram of a system 140 is shown. The system 140 generally comprises a number of speakers **102*a*-102*n*, a remote control 142, and a base station 150. The base station 150 generally comprises a power input 152, one or more auxiliary inputs 154, and a docking port 156. The power input 152 may be used to provide a supply voltage to the base station 150. The supply voltage is normally received from a transformer 158**.

The auxiliary inputs 154 may be implemented as one or more ⅛ inch stereo mini plugs, one or more RCA style jacks, one or more 1394 (firewire) jacks, one or more HDMI jacks or other jacks needed to meet the design criteria of a particular implementation. The auxiliary inputs 154 are normally configured to receive a line level signal from a source external to the base station 150. Such sources may include a compact disc player, an MP3 player, a radio, a tape player, or other audio devices. If the particular audio device does not have the particular type of connector for connection to the input jack on the base station 150, an adapter cord may be implemented. For example, a ⅛ inch stereo mini plug may be adapted to connect to 2 RCA type jacks.

In one example, the base station 150 may be configured to receive a compressed digital signal, such as a PCM signal, a DTS signal, etc. In such an implementation, a decoder circuit (not shown) may be implemented within the base station 150. Such a decoder circuit may be similar to the decoder found on a home audio receiver or preamplifier.

The docking port 156 may be used to connect a portable player 160 to the base station 150. The portable player 160 may be an iPod (available from Apple Computers), or other portable MP3 player. The docking port 156 may be used to receive audio signals from the player 160. The docking port 156 may also be used to charge the batteries of the player 160 when the player 160 is resting within the docking port 156. The docking port 156 may be adapted to hold one of a number of docking adapters (not shown). The docking adapters may be used to allow different sizes of portable players 160 to be used with the base station 150.

The base station 150 may be used to transmit a signal to the speakers **102*a*-102*n* in response to the audio signals received from the player 160. While four speakers 102*a*-102*n* are shown, the particular number of the speakers 102*a*-102*n* may be varied to meet the design criteria of a particular implementation. A common signal from the base station 150 is normally broadcast to and received by each of the speakers 102*a*-102*n*. Since each of the speakers 102*a*-102*n* receives the common audio signal, a wireless distributed audio system may be implemented. For example, the speaker 102*a* may be located in one room of a house (e.g., a living room). The speaker 102*b*** may be located in another room of a house (e.g., a bedroom). The remaining speakers may be located in other rooms of the house.

The base station 150 may transmit the common audio signal, in one example, using a 2.4 GHz digital transmission protocol. However, other transmission standards may be implemented to meet the design criteria of a particular implementation. The 2.4 GHz protocol may provide a 1.5 Mbps transmission data rate. The 2.4 GHz signal may implement digital spread spectrum technology and/or dynamic frequency hopping modulation. The 2.4 GHz signal may operate in the 2400 to 2483 MHZ frequency. Such a transmission rate may be sufficient to provide a high quality signal to each of the speakers **102*a*-102*n*. Since each of the speakers 102*a*-**

102*n* normally receives the same common audio signal, the full 1.5 Mbps data rate may be used. Using the full bandwidth for each individual speaker is in contrast to other wireless surround systems that need to divide the total available bandwidth between each speaker.

In one example, each of the speakers 102*a*-102*n* may also have a keypad that may be used to send a navigation control signal back to the base unit 150. The navigation control signal may be used to perform control functions (e.g., play, pause, fast forward, rewind, etc.) of the player 160. The remote control 142 may also be implemented to provide such control. In one example, the remote control 142 may be implemented as an infrared (IR) remote. With an IR remote, the antenna 108 may include an IR receiver to be used as a repeater to send the control signals back to the base station 150. The IR signals may be converted to RF signals for transmission, then either used directly by the base station 150 or converted back to IR for use by the base station 150.

In addition to sending control signals for use by the base station 150, the system 140 may be used as an IR repeater to send IR signals that may be used to control equipment other than the base station 150. While IR signals have been described, the remote control 142 may also be implemented to send RF signals to the base station 150. Furthermore, the navigation buttons normally present on the player 160 may also be used in addition to any signals used by the remote control 142.

In one example, the system 140 may implement a range extension system. Such a system may effectively double the range where the speakers 102*a*-102*n* may be placed. For example, the speakers 102*a*-102*n* may operate effectively at a range of about 150 feet. With the range extension system activated, the speakers 102*a*-102*n* may operate at a range of 300 feet. The range extension system may operate by initially delaying the time after the speakers 102*a*-102*n* receive a signal, but before generating an audio signal through the drivers. In one example, the delay may be 64 ms. However, a delay in the range of 60 to 75 ms, or even 50 ms to 200 ms, may also be implemented. During the delay period, the speakers 102*a*-102*n* may determine if data packets received from the base station 150 are valid or corrupted. If the packets are corrupted, the speakers 102*a*-102*n* may request a retransmission. The determination of a valid packet and the request for a retransmission normally occur within the 64 ms delay. Therefore, no interruptions in music playback occur and the system range and/or robustness may be improved.

In one example, the base station 150 may also have speaker drivers. In such an implementation, the base station may or may not also implement the delay. By implementing the delay, the sound from the base station 150 may match the sound from the speakers 102*a*-102*n*. Such an implementation may be useful in a system where one or more of the speakers 102*a*-102*n* are located in the same room as the base station 150. By matching the delay, no audible difference between the base station 150 and the speakers 102*a*-102*n* would be heard. Such delay matching may be useful in some implementations, but may not be needed in a typical installation where the speakers 102*a*-102*n* are located in different rooms than the base station 150.

Figure 5:
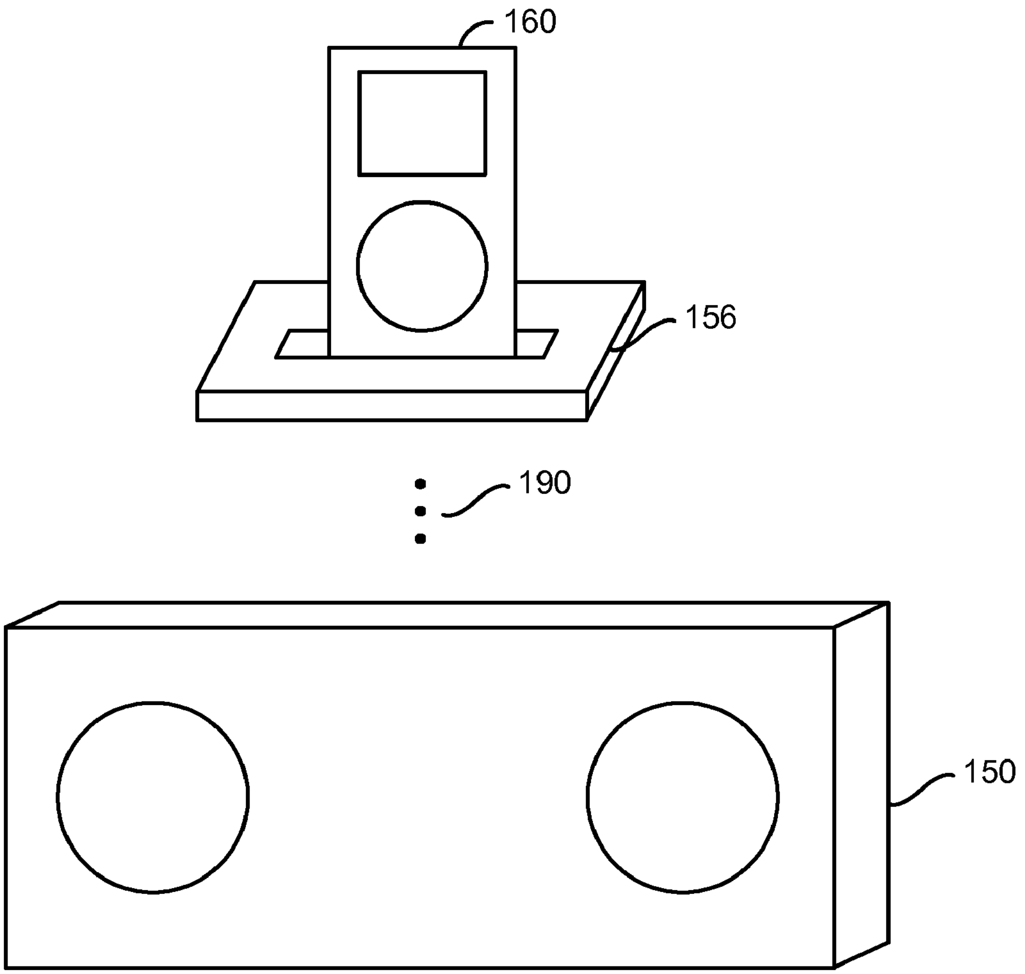
FIG. 5 is a diagram of an alternate control arrangement.

Referring to FIG. 5, a diagram is shown illustrating an alternate control arrangement. The docking port 156 is shown removed from the base station 150. The device 160 is shown connected to the docking port 156. The docking port 156 may be in wireless communication with the base station 150 (shown as the signal 190). In such an arrangement, the device 160 may be in wireless communication with the base station 150, while the base station 150 may also be in wireless communication with the various speakers 102*a*-102*n* (not shown in FIG. 5). A significant part of the development of the device 160 may include the continuous improvement of the interface. By allowing a user to use the actual device 160 to control the system of the present invention, the interface of the device 160 does not need to be duplicated. Modern devices (e.g., the ipod nano, etc.) are becoming quite portable. Using the device 160 as a remote control may be more practical than duplicating the interface of the device 160 on a second remote control. The interface 156 may be designed to minimize the additional size of the combination of the device 160 and the interface 156.

Figure 6:
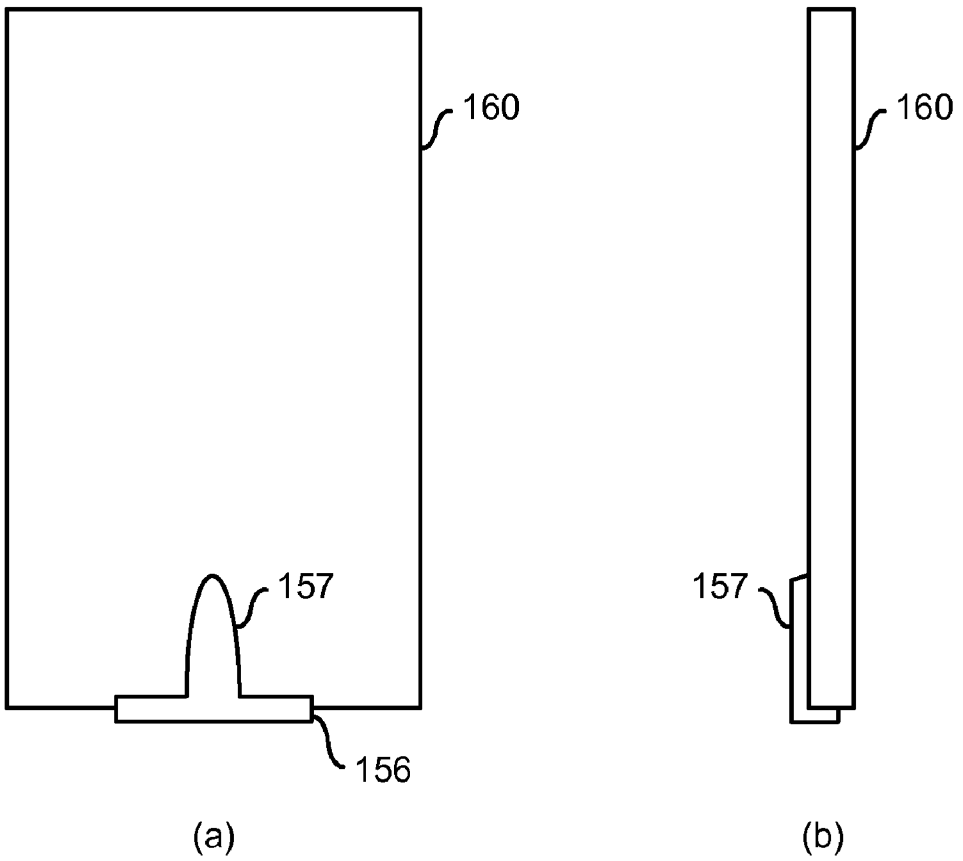
FIG. 6 is a diagram illustrating an example of the docking arrangement of FIG. 5.
Figure 7:
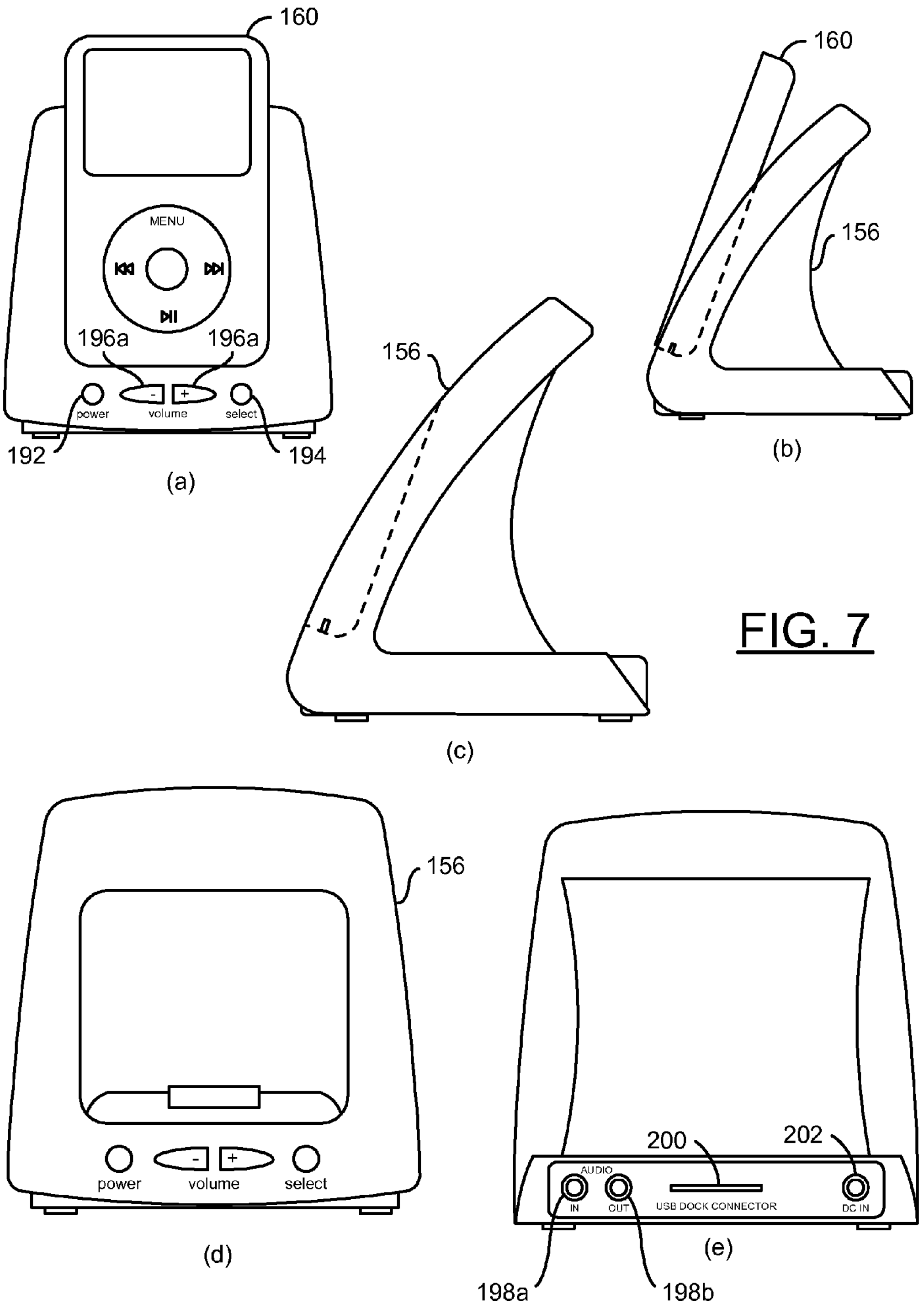
FIGS. 7A-E are diagrams illustrating a more detailed example of the docking arrangement of FIG. 5.

Referring to FIG. 6, an example of the device 160 is shown having a very small interface 156. The interface 156 may plug into the data I/O of the device 160 and provide a small (relative to the device 160) antenna 157. In one example, the antenna 157 may be fixed to the interface 156. In another example, the antenna 157 may be removable and/or replaceable. FIG. 6*b* shows a side view illustrating the size of the antenna 157 versus the size of the device 160. While a particular size of the antenna 157 has been shown, a smaller antenna may also be implemented. In one example, the antenna 157 may be narrower and/or shorter than the example shown in FIG. 6. In another example, the antenna 157 may be wider and/or taller than the example shown in FIG. 6.

Referring to FIGS. 7A-E, diagrams of the wireless base station 156 are shown. In FIG. 7, the wireless base station 156 is shown having more details. For example, a power switch 192 may be implemented. A select switch 194 may also be implemented. A volume switch 196*a*-196*b* is also shown. The base station 156 may allow charging to the device 160. Additionally, the rear connection of the base station 156 is shown having a set of audio outputs 198*a*-198*b*, an interface 200 and a power input 202. The input 202 may receive DC power that may be used to charge the device 160. The interface 200 may be an universal serial bus (USB) interface. However, other interfaces such as firewire, may also be implemented. The interface 200 may be used to provide a wired connection to the base station 150. A wired connection may be used if a wireless connection is not needed and/or desired.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:

a housing;

a speaker mounted within said housing;

a concave portion within said housing configured to hold a transformer;

an amplifier within said housing configured to receive power through a connection to said transformer; and a clip connected to said housing with a pivot, wherein said clip is configured to rotate away from said concave portion to allow said transformer to be positioned within said concave portion.

2. The apparatus according to claim 1, further comprising:

a plate having a first side connected to said housing, wherein said plate (i) is configured to swivel away from said housing around an axis defined by said first side, (ii) allows said transformer to be positioned within said concave portion when said plate is swivelled and (iii) secures said transform in said concave portion when said plate is secured to said housing.

3. The apparatus according to claim 2, wherein said plate is secured to said housing by snapping into a pre-formed indentation formed in said housing.

4. The apparatus according to claim 1, wherein said clip is also configured to rotate in front of said concave portion to secure said transformer within said concave portion.

5. The apparatus according to claim 1, wherein said clip is also configured to rotate onto a top portion of said transformer to secure said transformer within said concave portion.

6. The apparatus according to claim 1, wherein said apparatus is configured to be held onto said transformer when said transformer is plugged into a wall socket.

7. The apparatus according to claim 1, wherein said apparatus is configured to be installed close to said transformer, wherein said transformer is connected to said apparatus with one or more wires.

8. An apparatus comprising:

a housing;

a speaker mounted within said housing;

a concave portion within said housing configured to hold a transformer;

an amplifier within said housing configured to receive power through a connection to said transformer; and a plate having a first side connected to said housing, wherein said plate (i) is configured to swivel away from said housing around an axis defined by said first side, (ii) allows said transformer to be positioned within said concave portion when said plate is swivelled and (iii) secures said transform in said concave portion when said plate is secured to said housing.

9. The apparatus according to claim 8, wherein said plate is secured to said housing by snapping into a pre-formed indentation formed in said housing.

10. The apparatus according to claim 8, further comprising:

a clip connected to said housing with a pivot, wherein said clip is configured to allow said transformer to be positioned within said concave portion.

11. The apparatus according to claim 10, wherein said clip is also configured to rotate in front of said concave portion to secure said transformer within said concave portion.

12. The apparatus according to claim 10, wherein said clip is also configured to rotate onto a top portion of said transformer to secure said transformer within said concave portion.

13. The apparatus according to claim 8, wherein said apparatus is configured to be held onto said transformer when said transformer is plugged into a wall socket.

14. The apparatus according to claim 8, wherein said apparatus is configured to be installed close to said transformer, wherein said transformer is connected to said apparatus with one or more wires.

15. The apparatus according to claim 8, wherein further comprising an antenna configured to receive a source signal through a wireless connection.

16. The apparatus according to claim 1, wherein further comprising an antenna configured to receive a source signal through a wireless connection.

* * * * *